United States Patent [19]

Ishimaru et al.

[11] 4,440,282
[45] Apr. 3, 1984

[54] CLUTCH DRUM FOR AUTOMATIC AUTOMOTIVE TRANSMISSION

[75] Inventors: Wataru Ishimaru, Zushi; Kazuyoshi Fujioka, Tokyo, both of Japan

[73] Assignee: Nissan Motor Co., Ltd., Yokohama, Japan

[21] Appl. No.: 315,631

[22] Filed: Oct. 28, 1981

[30] Foreign Application Priority Data

Nov. 6, 1980 [JP] Japan ................................ 55-156877

[51] Int. Cl.³ .................... F16D 13/68; F16D 67/04; F16H 57/10
[52] U.S. Cl. ............................... 192/70.2; 74/781 R; 188/72.4; 192/18 A; 192/85 AA
[58] Field of Search ................ 192/18 A, 70.19, 70.2, 192/85 AA; 74/781 R; 188/72.3, 72.4

[56] References Cited

U.S. PATENT DOCUMENTS

| | | | |
|---|---|---|---|
| 2,935,169 | 5/1960 | Mills | 192/85 |
| 3,307,430 | 3/1967 | Bauder | 74/763 |
| 3,744,605 | 7/1973 | Piret | 192/70.2 |
| 3,747,727 | 7/1973 | Dach | 192/70.2 X |
| 3,765,519 | 10/1973 | Kell | 188/366 |
| 3,837,439 | 9/1974 | Piret | 192/85 AA X |
| 3,926,073 | 12/1975 | Roche | 74/753 |

OTHER PUBLICATIONS

ATZ, Sep. 1969, Technical Publication, pp. 307–309.

*Primary Examiner*—Allan D. Herrmann
*Attorney, Agent, or Firm*—Thompson, Birch, Gauthier & Samuels

[57] ABSTRACT

A clutch drum for an automatic transmission features a large diameter portion in which a plurality of first slots define castle-like projections about one end thereon and a second set of slots which originate in the projections near the tops thereof and which extend to and terminate in an essentially frusto-conical portion which interconnects the large diameter portion and a small diameter portion containing a piston therein. The first slots serve to mount clutch discs within the drum while the second slots mount discs about the drum. The relatively wide castle-like projections allow the production of the drum from relatively light gauge sheet metal, which has adequate structural rigidity and a reduced maximum diameter.

4 Claims, 8 Drawing Figures

CLUTCH DRUM FOR AUTOMATIC AUTOMOTIVE TRANSMISSION

BACKGROUND OF THE INVENTION

1. Field of the Invention

The present invention relates generally to an automatic automotive transmission and more specifically to a clutch drum for a planetary gear unit of such a transmission.

2. Description of the Prior Art

In a previously proposed arrangement, such as shown in FIG. 1 of the drawings, a clutch drum 100 has been manufactured via press forming. In this arrangement, the plurality of corrugations 101 define both internal and external spline teeth which mount a plurality of clutch discs 102,103 on the exterior and in the interior thereof. This arrangement while being light in weight has suffered from the drawback of requiring a degree of precision during manufacture which renders mass production thereof excessively expensive.

As a solution to this it has been proposed to press form an arrangement such as shown in FIG. 2 of the drawings. In this arrangement a plurality of slots 104 define elongate castle-like fingers 105 about the end of the drum 106 which serve as spline teeth for mounting clutch discs on the exterior and within the interior of the drum. However, this arrangement has suffered from the drawback that the sheet from which the drum is pressed must be adequately thick so as to endow on the elongate fingers 105 the required structural strength to withstand the inevitable torque variations. This of course increases the weight of the drum and further requires more power when pressing due to the gauge or thickness of the sheet metal.

SUMMARY OF THE INVENTION

The present invention features a clutch drum which is press formed so as to have a large diameter portion, a small diameter portion, a frusto-conical section interconnecting the large and small diameter portions, a plurality of first slots formed in the large diameter portion which slots extend from one end thereof toward the small diameter portion and which terminate short of the frusto-conical section, the first slots defining at one end of the drum a plurality of equidistantly spaced castle-like projections, and a plurality of second slots formed in the drum which slots are each formed in a projection and which each lead from inboard or the end of a projection and terminate in the frusto-conical section.

With this arrangement, due to the width of the castle-like projections (or castles), the thickness of the sheet from which the drum is formed may be reduced as compared with the arrangement shown in FIG. 2. With this arrangement it will be appreciated that by extending the "second" set of slots, so as to terminate in the frusto-conical portion, the clutch discs mounted on the exterior of the drum may be slipped into place over the small diameter portion while the discs disposed within the large diameter portion may be inserted into place through the mouth of the large diameter portion.

Further, by angling the minor edges of the slots which terminate in the frusto-conical portion (as shown in FIGS. 5 and 6 of the drawings), it is possible to avoid any damage to the seals disposed about a piston which is reciprocally received in the small diameter portion of the drum.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 4:
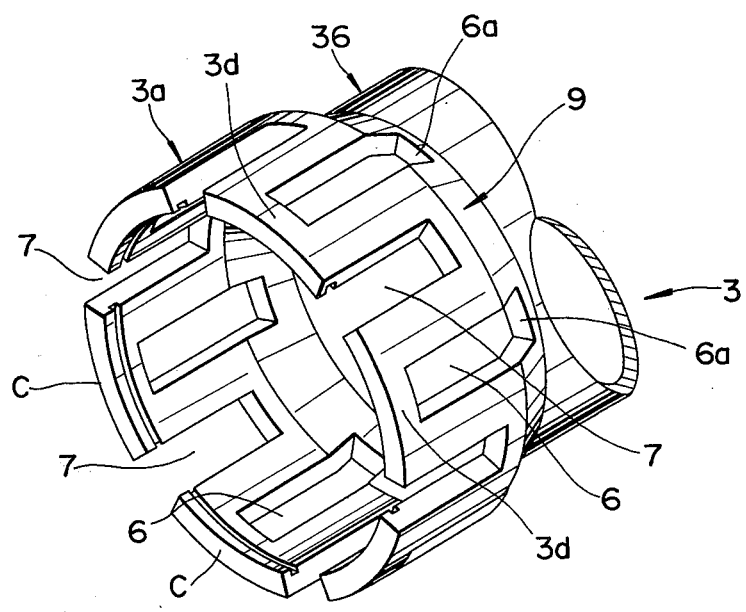
FIG. 4 is a perspective view of a clutch drum according to the present invention.
Figure 5:
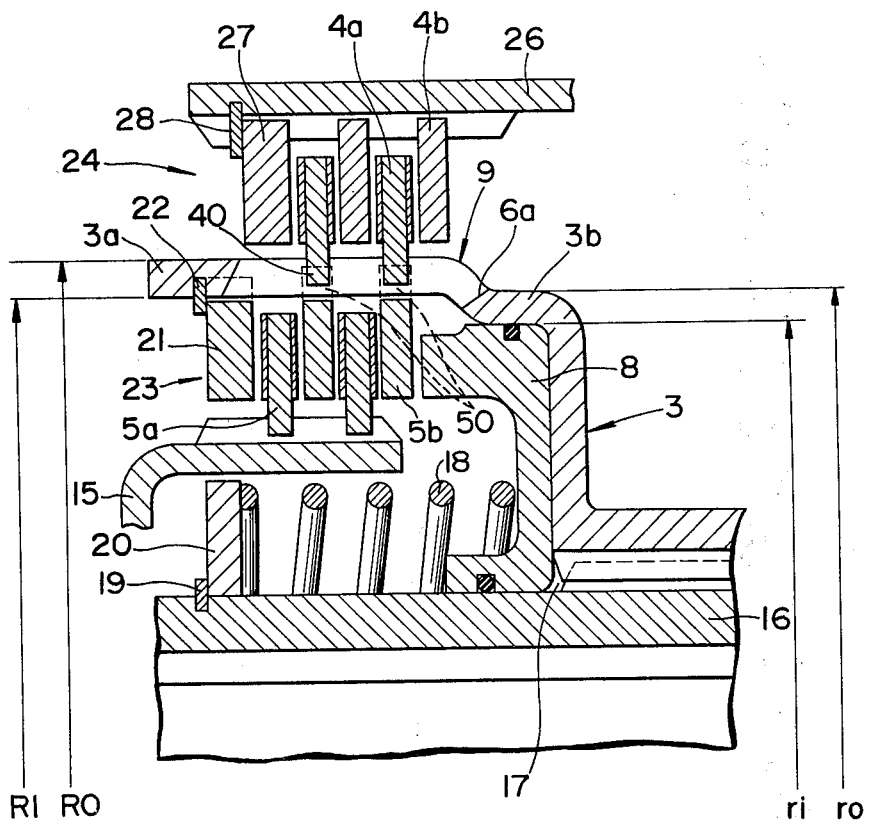
FIG. 5 is a sectional view of the clutch drum shown in FIG. 4 mounted in the transmission shown in FIGS. 3A and 3B.

Turning firstly to FIGS. 4 and 5, a first embodiment of the present invention is shown. In these figures, the numeral 3 denotes a clutch drum formed by press working. As shown this drum is formed so as to have a large diameter section or portion 3a having an outer diameter RO and an inner diameter RI. The drum is also formed to have a small diameter portion 3b having an outer diameter ro and an inner diameter ri. An integral and essentially frusto-conical or boundary portion 9 interconnects the large and small diameter portions. A plurality of "first" slots 7 are formed in the large diameter portion 3a and are arranged to extend parallel to the axis of rotation of the drum 3. These slots, as shown, extend from the end of the large diameter portion 3a toward the small diameter portion 3b and terminate short of the frusto-conical portion 9 (which alternatively may be a frusto hyperboloid section or the like) to form a plurality of castle-like projections or castles C about the end of the large diameter portion 3a. A second set of slots 6 are formed in the large diameter portion 3a and are arranged to extend from a level inboard of the ends of the castles and terminate in the frusto-conical section 9. This arrangement thus defines a plurality of bridge-like portions 3d which close off the slots 6 and interconnect pairs of fingers which extend along either side of a castle.

As best seen in FIG. 5, a plurality of "drive" clutch plates or first discs 4a having radially inwardly projecting teeth 40 are disposed about the large diameter portion 3a with the teeth 40 engaged in the slots 6. These discs have a minimum inner diameter which is slightly greater than the maximum outer diameter of the minor edges 6a defined in the frusto-conical section by the slots 6, so as to allow the ready installation of the discs via passing same over the small diameter portion 3b of the drum and subsequent insertion of the teeth in the slots 6. A plurality of "driven" second clutch discs 5b having radially outwardly extending teeth 50 are disposed within the large diameter portion 3a with the teeth engaging in the slots 7.

Figure 1:
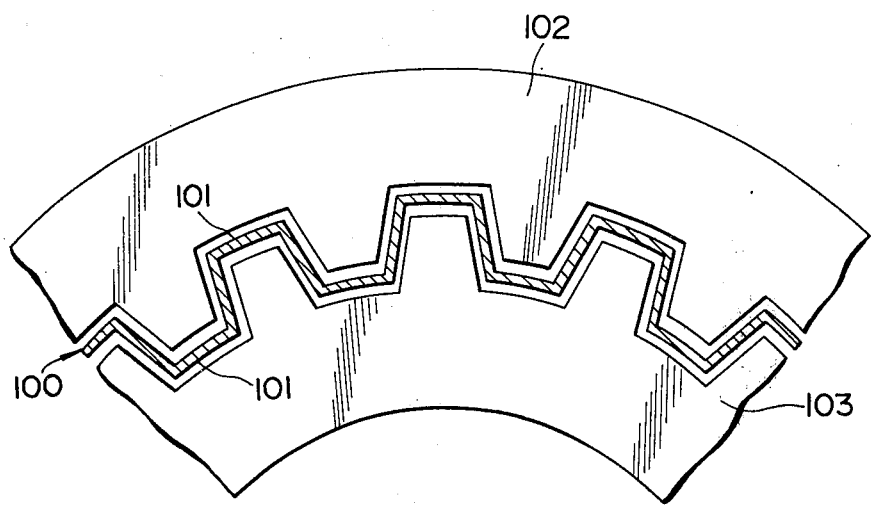
FIG. 1 is a partial sectional elevation of a prior art arrangement discussed in the opening paragraphs of this disclosure.
Figure 2:
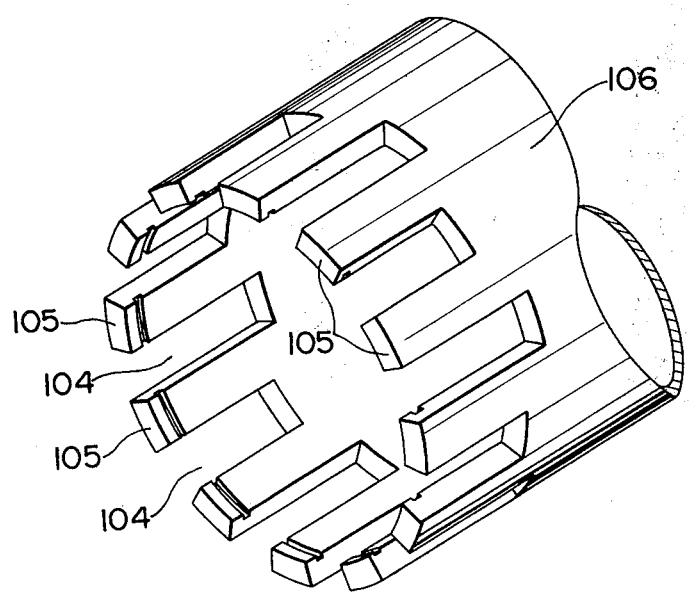
FIG. 2 is a perspective view of a portion of a clutch drum discussed in the opening paragraphs of this disclosure.
Figure 3A:
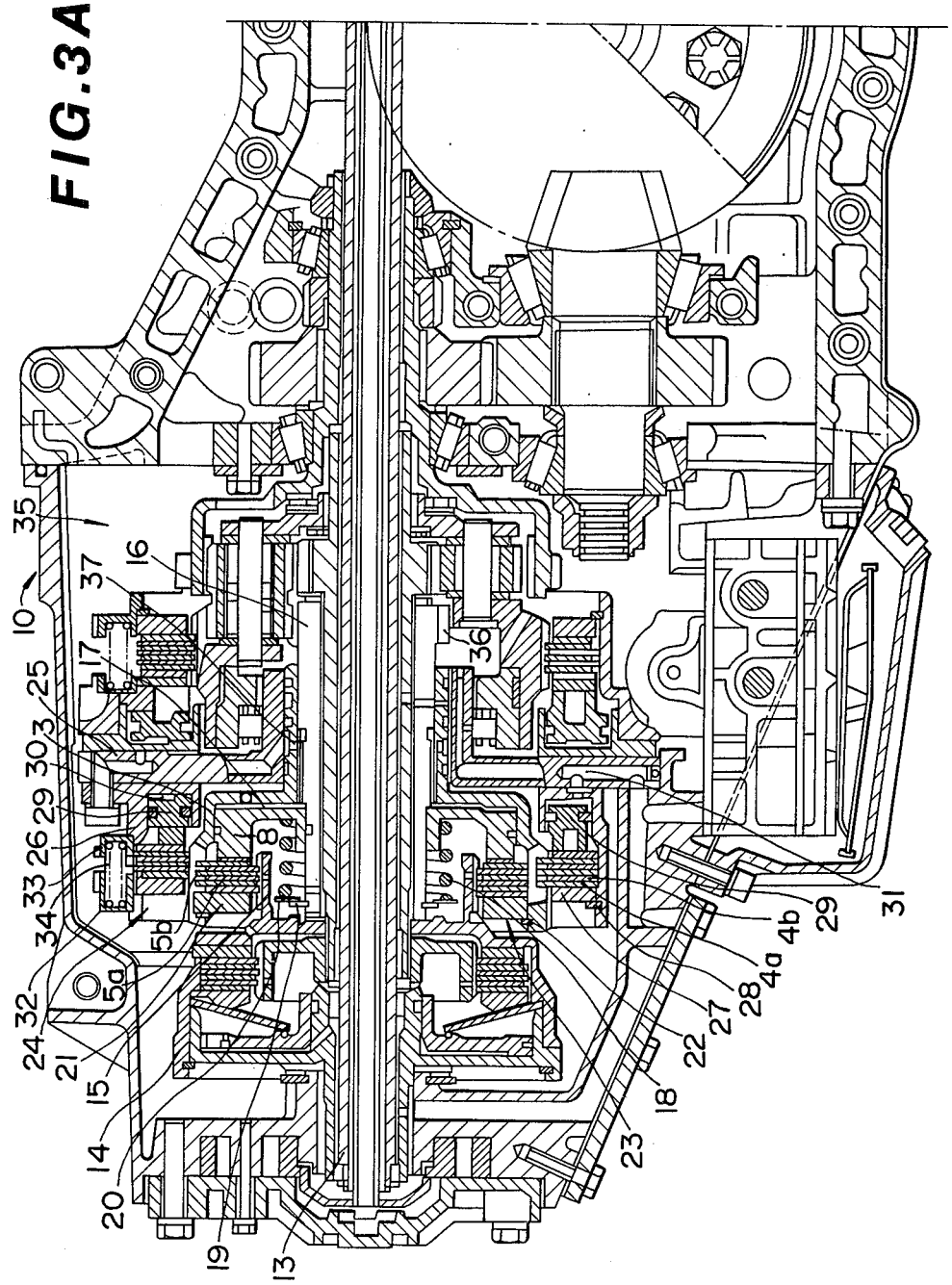
FIGS. 3A and 3B are a longitudinal section of a transmission in which the clutch drum of the present invention may be utilized.
Figure 3B:
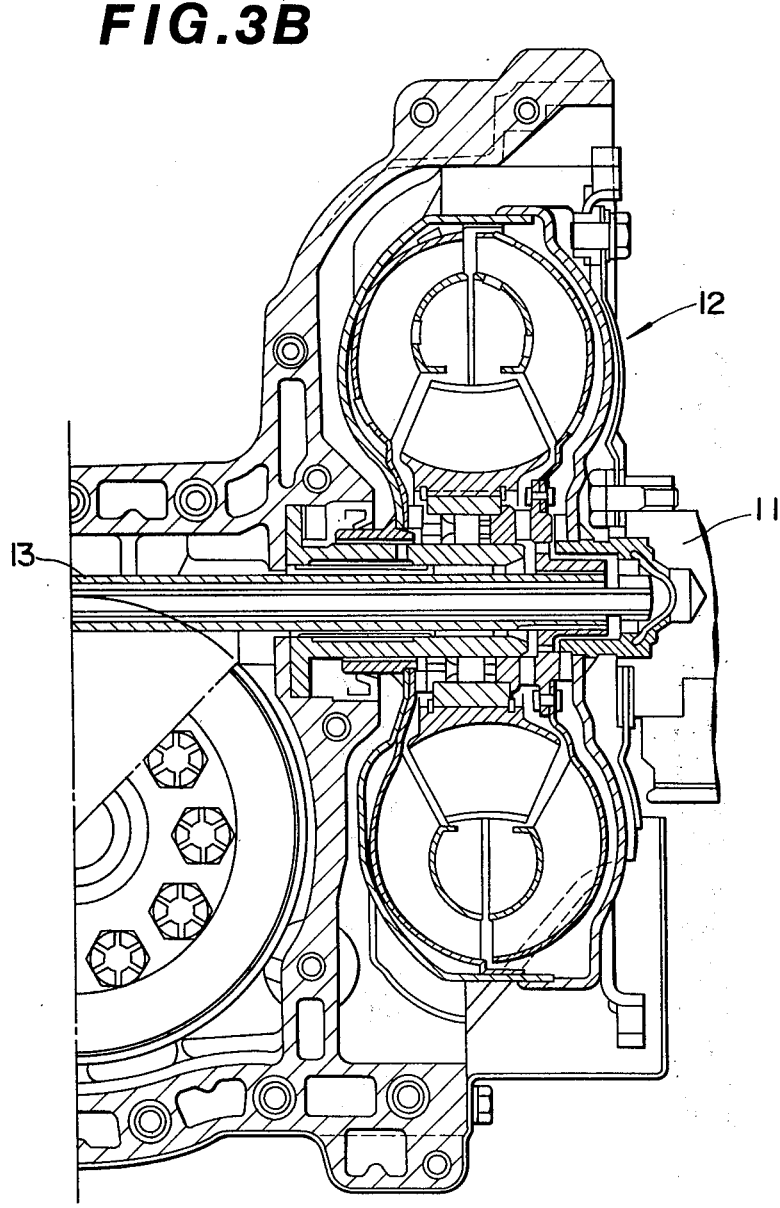

Turning now to FIG. 3 the above described clutch drum arrangement is shown disposed within a planetary gear transmission 10 wherein the numeral 11 denotes an engine crankshaft which is connected to a torque converter 12 which receives torque from the engine and transmits same to the planetary gear unit through a hollow turbine or input shaft 13. One end of the input shaft is splined to a clutch drum unit 14 which has a clutch hub 15 formed integrally therewith. The clutch hub 15 has a plurality of "drive" fourth discs 5a splined thereon for synchronous rotation therewith. These discs as shown in FIG. 5 are interleaved with the discs 5b disposed within the large diameter portion 3a of the drum 3.

A piston 8 is disposed within the small diameter portion 3b of the clutch drum 3 so as to define a variable volume fluid chamber 17. This chamber is selectively fed pressurized fluid from a control circuit incorporated in the lower part of the transmission via a passage 37 including radial bores formed in the hollow shaft 16. A coil spring 18 is disposed between the piston 8 and a spring retainer 20 which is held in place by snap ring 19 fixed to the exterior of the hollow shaft 16. This spring biases the piston 8 to the right (as seen in the drawings) to minimize the volume of the chamber 17.

A retaining plate 21 is interposed between a snap ring 22 which is secured to the inner periphery of the drum 3 and the interleaved clutch discs 5a and 5b. This retaining plate serves to retain the discs in the drum and to act as a reaction member for the clutch plates when the clutch is engaged. The just described clutch drum 3, the clutch discs 5a, 5b, spring 18, piston 8 and the spring retainer 20, con a "second" clutch generally denoted by the numeral 23.

A clutch drum 26 is secured to a stationary casing 25 and has a plurality of third clutch discs 4b splined to the inner periphery thereof. These discs are interleaved with the discs 4a disposed on the outer periphery of the drum 3. A retaining plate 27 is secured to the inner periphery of the clutch drum 26 by a snap ring 28. This plate both secures the clutch discs 4b within the drum 26 and also acts as a reaction member when the clutch is engaged. A piston 29 is disposed within a cavity formed in the clutch drum 26 to define a variable volume chamber 30. This chamber fluidly communicates with a passage 31 formed in the casing 25. Lugs 32 and 33 are provided on the clutch drum 26 are biased apart by a spring 34 and function to bias the discs 4a and 4b apart when the chamber 30 is not pressurized.

The clutch drum 3, the clutch discs 4a, 4b, the spring 34, the piston 29, the clutch drum 26, chamber 30, lugs 32, 33 and the retaining plate 27 define a "first" clutch 24 which has a braking function. viz., functions as a brake.

As the clutch drum 3 is splined to the hollow shaft 16 which in turn supports a first sun gear 36 of the planetary gear train 35, and the clutch drum 3 is rotatably supported in the casing 25 so that the boss portion thereof communicates with the passage 37; when fluid pressure is directed through the passage 37 to the chamber 17, the piston 8 presses the clutch plates discs 5a and 5b together against the bias of the spring 18 so that the "second" clutch 23 is engaged and connects the first sun gear 36 with the input shaft 13 through the clutch drum 3 and clutch drum unit 14. Under these conditions, due to the inherent structural strength of the castles C, power is transmitted smoothly and securely.

When the passage 31 is pressurized, the pressure developed in the chamber 30 causes the piston 29 to press the clutch discs 4a, 4b together against the bias of the spring 34 interposed between the lugs 32, 33 and thus engages the "first" clutch. Thus the clutch drum 3 is braked via the connection to the stationary casing 25. As before, the inherent strength of the clutch drum 3 ensures that power is smoothly and securely transmitted. For further details relating to the above disclosed transmission reference is made to the technical publication "ATZ" 71 Jahrgang. Nr. 9 September 1969 Pages 307 to 309.

Figure 6:
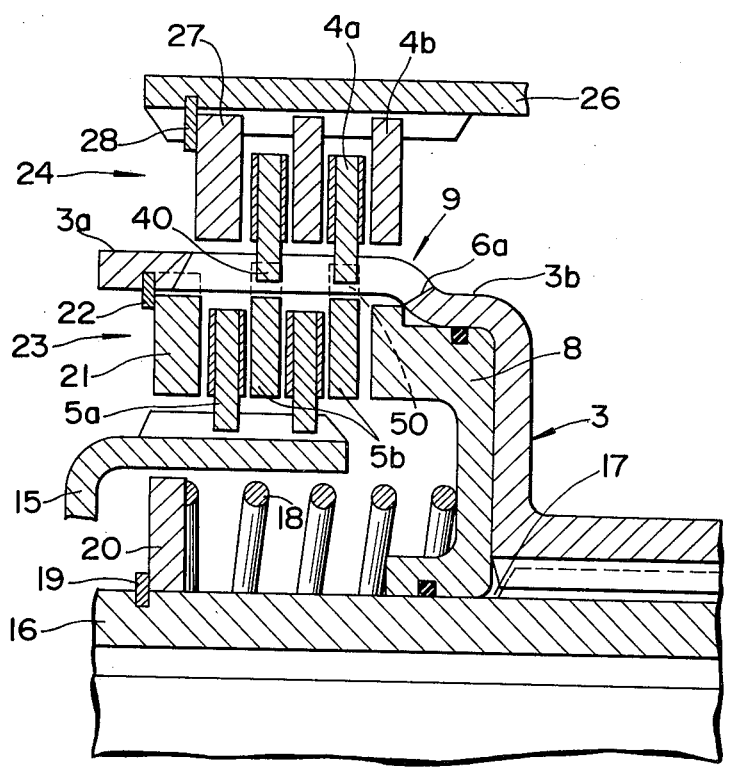
FIG. 6 is a sectional view similar to FIG. 5 showing a possible variation in design of the piston which is received in the clutch drum.

FIG. 6 shows a variation of the arrangement described hereinbefore wherein the surface area of the piston 8 which engages the first of the clutch discs 5b is increased to ensure a positive grip therebetween.

Figure 7:
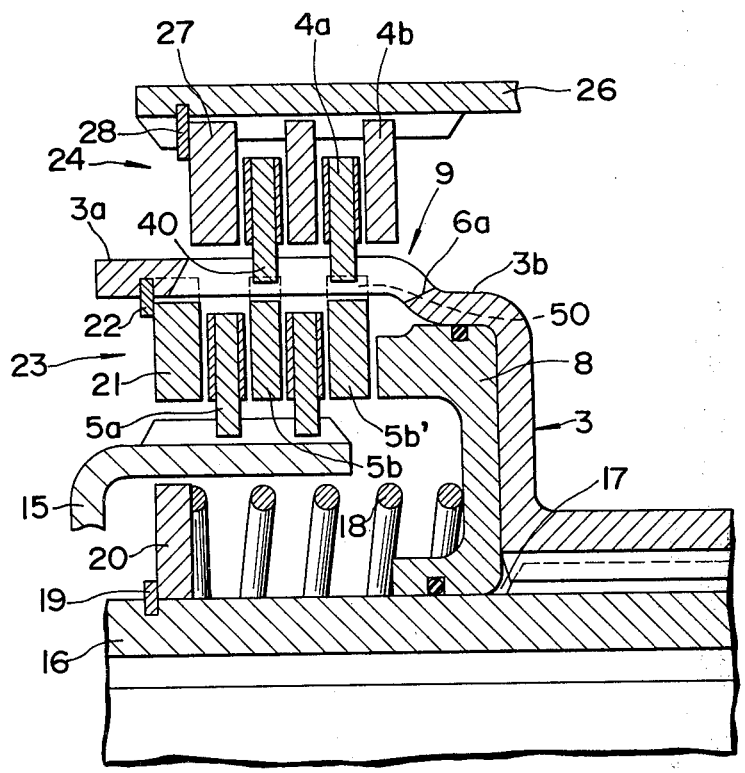
FIG. 7 is sectional view showing the provision of a special clutch disc which is engaged by the piston.

FIG. 7 shows a second variation wherein the clutch disc 5b' which is directly engaged by the piston 8 is thicker than the others so that bending or the like due to the movement of the piston and/or friction generated heat, is eliminated.

Thus, in summary, the present invention features a readily produced light and sturdy clutch drum which also permits the radial dimension of the drum to be minimized as the inner diameter RI of the large diameter portion 3a is essentially equal to the outer diameter ro of the small diameter portion 3b.

What is claimed is

1. In an automatic automotive transmission including a planetary gear train,
a clutch drum comprising:
a large diameter portion;
a small diameter portion;
an essentially frusto-conical section inteconnecting said large and small diameter portions;
means defining a plurality of first slots in said large diameter portion which slots extend from one end thereof toward said small diameter portion and which terminate short of said frusto-conical portion, said first slots defining at one end of said drum a plurality of equidistantly spaced castle-like projections;
means defining a plurality of second slots in said drum which slots are each formed in a projection and which each lead from inboard of the end of a projection and terminate in said frusto-conical section.

2. A clutch drum as claimed in claim 1, wherein the outer diameter of the small diameter portion is essentially equal to the inner diameter of said large diameter portion.

3. A clutch drum as claimed in claim 1, wherein a plurality of second clutch discs are disposed within said large diameter portion, said second discs each having teeth which engage in said first slots, and a plurality of first clutch discs disposed about said large diameter portion, said first clutch discs each having teeth which engage in said second slots, said clutch drum further including a piston reciprocally disposed within said small diameter portion which is adapted to be driven against said second clutch discs to press same together.

4. A clutch drum as claimed in claim 3, wherein said plurality of first discs are interleaved with a plurality of third discs, said third discs being splined to a stationary drum, and wherein said plurality of second discs are interleaved with a plurality of fourth discs, said fourth discs being splined on a member which is adapted for synchronous rotation with an input shaft of said transmission.

* * * * *